Figure 1:
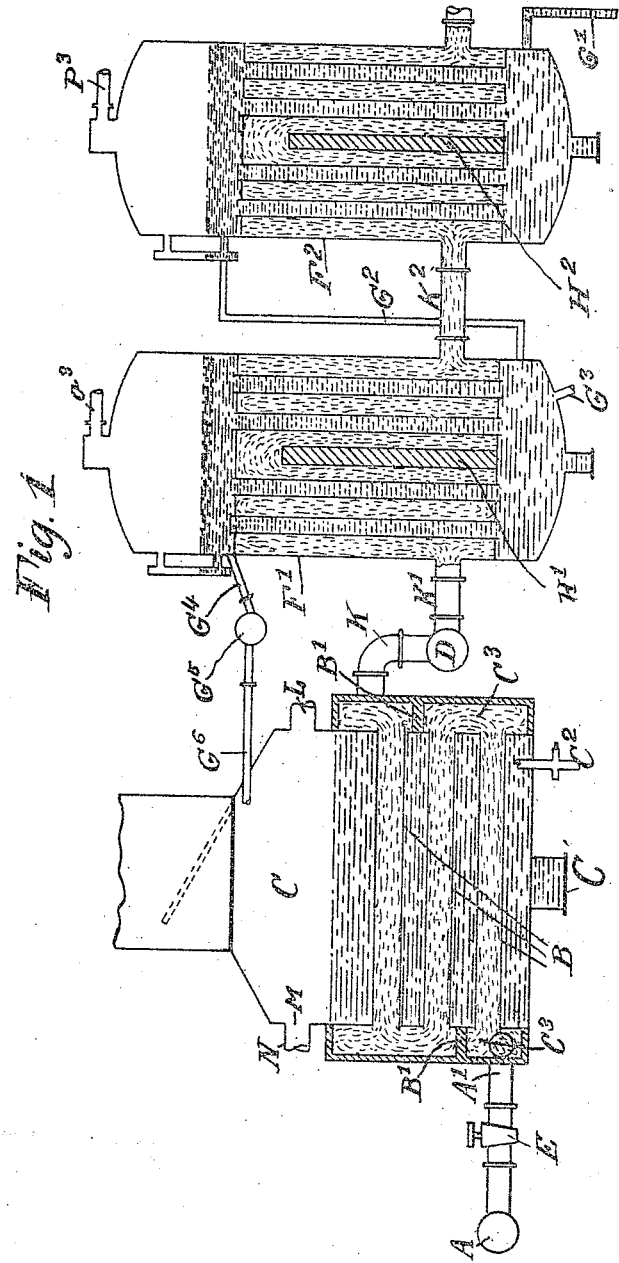

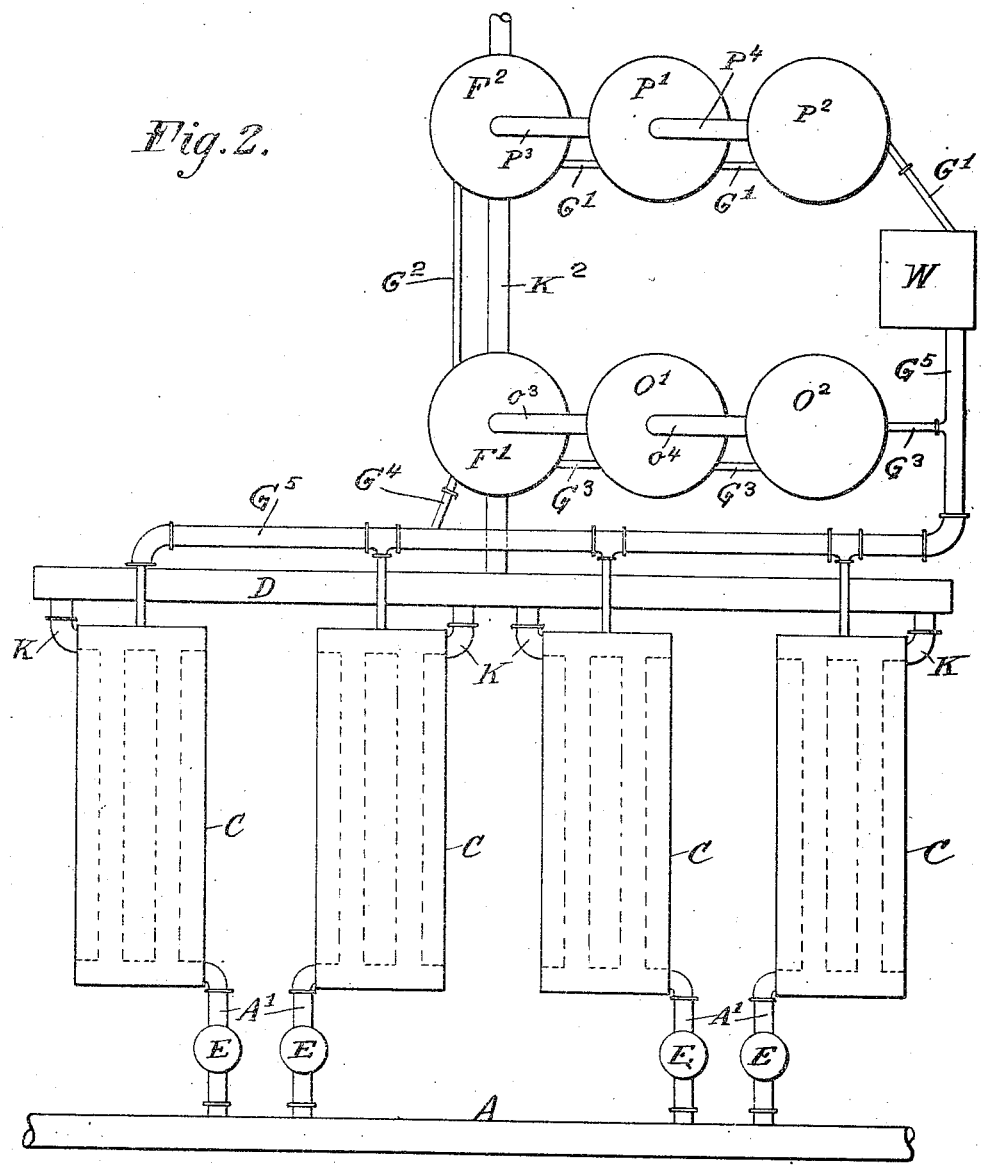

UNITED STATES PATENT OFFICE.

OTTO K. ZWINGENBERGER, OF PERTH AMBOY, NEW JERSEY, ASSIGNOR TO THE ROESSLER & HASSLACHER CHEMICAL CO., OF NEW YORK, N. Y., A CORPORATION OF NEW YORK.

METHOD OF HEATING AND EVAPORATING LIQUIDS.

1,104,285.   Specification of Letters Patent.   Patented July 21, 1914.

Application filed November 25, 1911. Serial No. 662,276.

*To all whom it may concern:*

Be it known that I, OTTO K. ZWINGENBERGER, a subject of the Emperor of Germany, and a resident of Perth Amboy, in the county of Middlesex and State of New Jersey, have invented certain new and useful Improvements in the Method of Heating and Evaporating Liquids, of which the following is a specification.

The invention relates to the systematic utilization of the sensible heat of producer gas and other like gases for the purpose of heating and evaporating liquids, concentrating chemical solutions and the like. In concentrating chemical solutions by the heat from exhaust-steam, for example, there were at the outset, certain difficulties which, however, did not originate so much with regard to the application of steam for this purpose as in the action of the chemicals on the material of the evaporation apparatus. These latter difficulties, as well as the construction of suitable vacuum evaporating apparatus, which also aided in overcoming them, were easily solved in a relatively short time.

The use of gas engines as a source of power, however, gives to the question of utilizing the waste heat of this modern machinery quite another aspect, as we have here two different sources of waste heat. Large units of such engines are fed with so-called "producer gas," which is generated in producers close to the engine station. These producer gases represent one source of waste heat as they must be cooled before use in the engine, the other source being the hot gas produced by the explosions in the cylinder of the engine. The utilization of the sensible heat of such producer gas, of the explosion gases of gas engines, of coke oven gas and the like gases for heating and evaporating liquids is the purpose of this invention. The term "liquids" as used herein is intended to cover broadly any aqueous solution containing a chemical compound or a mixture of such compounds. The utilization of the heat from hot producer gases for the purpose of evaporating such liquids meets with many difficulties having their chief source in the great difference between the temperature of the applied gases and the boiling point of the liquids to be evaporated. For example liquids, carrying dissolved salts, alkalis or other chemicals of usually solid consistency, cannot be evaporated with the expected good results when working according to the usual methods recommended by success in other lines. Certain phenomena occur due to the high temperature of the gases and to the nature of the chemicals dissolved in the liquids, the influence of which lowers the result in a very undesirable way.

Based on some inventions of Hans Foersterling, for which applications for U. S. Letters Patent are pending under Serial Nos. 366,724, 370,699 and 523,925, I have found that heating and evaporating liquids by the heat from hot producer gases for instance, can be successfully carried out by working in a certain way and maintaining certain conditions which will prevent the occurrence of these phenomena. This purpose can be successfully attained by distributing the hot producer gases, or other gases, over a plurality of primary evaporation vessels in such a way that the liquid in question will never reach the boiling point, but may always be kept, on the average, about 5 degrees centigrade below the boiling point, thus reducing the effect of the heat of the gases to such an extent that later on the evaporating of liquids may be performed in the same way as is done by steam in the various apparatus according to the usual practice in this line of work.

I am aware that coke-oven gases for instance, have been used for concentrating liquids, but this was regularly done in plain pans without any regulation of the distribution of gas in the sense of my invention and consequently there was no control of the temperature in the sense of my invention to keep the liquid constantly somewhat below the boiling point.

I will now describe my process in connection with an apparatus illustrating one means of practising my process and for a full and clear understanding thereof, reference is made to the accompanying drawings in which—

Figure 1 is a front elevation, partly in section and partly broken away, of a portion of the apparatus, and Fig. 2 is a plan view, partly broken away, of the complete apparatus.

Similar letters and numerals of reference indicate similar parts throughout the several views.

The hot producer gases coming from a producer (not shown) through a main feed pipe A are conducted through pipe $A^1$ controlled by valve E, of any suitable construction into a primary evaporation vessel C where they enter a flue $C^3$, whence they are conducted through a system of parallel tubes B arranged as in a horizontal tubular boiler, the hot producer gases entering at the bottom and being caused to pass through the respective layers of pipes B by means of baffle-plates $B^1$ arranged in the flues $C^3$. The gases leave the tubes B near the top of vessel C and enter main collector pipe D. Any suitable number of vessels C may be arranged in parallel and provided with the connection described, in Fig. 2, for example I have shown four such vessels.

By admitting the hot producer gases into the tubes B at the bottom of vessel C the liquid in the vessel C surrounding the tubes B is so heated that it undergoes a steady circulation from the bottom to the top of the vessel as the liquid in the lower part is subjected to a greater heat than that in the upper part of the vessel and hence becoming lighter, rises and causes a continuous circulation which makes for a uniform temperature of the liquid in said vessel.

All of the main pipes, connection pipes and valves which are subjected to the heat from the hot gases are preferably lined inside with suitable heat insulating material (not shown).

Main collector pipe D may be disconnected from any of vessels C by any of the well known ways, such as by a controlling valve in pipe K (not shown).

The hot gases, after passing through tubes B and vessel C, enter the main pipe D through pipe K, pipe D acting as a collector pipe from the several vessels C, and from there the gases pass into a system of main tubular boilers $F^1$, $F^2$, the construction of which is more specifically pointed out hereinafter and which is clearly illustrated in the drawings. There may be any suitable number of main steam boilers connected either in series, in parallel or series parallel, but I have here shown two boilers connected in series as I believe such an arrangement to be the most efficient. Each of boilers $F^1$, $F^2$, is preferably connected with a series of auxiliary boilers, here shown as consisting of two such auxiliary boilers in each series, $O^1$ and $O^2$ and $P^1$ and $P^2$ respectively. The auxiliary boilers in their operation preferably depend on the steam which is generated in the boilers $F^1$, and $F^2$ by the hot gas passing through these latter, the auxiliary boilers being preferably operated on the same principle as the vacuum-evaporation apparatus used in the various industries, as for instance, in the manufacture of sugar and soda wherein considerable volumes of liquids are evaporated. In the apparatus shown the steam generated in boiler $F^1$ serves to heat boiler $O^1$ and the steam generated in boiler $O^1$ serves to heat boiler $O^2$. The boilers $P^1$ and $P^2$ are heated by the steam from boiler $F^2$ in a corresponding manner. Pipe $O^3$ conducts the steam from boiler $F^1$ to near the bottom of boiler $O^1$ and pipe $O^4$ conducts the steam from boiler $O^1$ to near the bottom of boiler $O^2$. Pipes $P^3$ and $P^4$ perform similar functions to pipes $O^3$ and $O^4$. A special feature of the process is that the liquid during the evaporation process travels in a direction opposite that of the gas.

W indicates a weak-liquor storage tank mounted on an elevation above the rest of the apparatus and provided with suitable discharge connections $G^1$ and $G^5$, $G^1$ discharging into the series of boilers $P^2$, $P^1$ and $F^2$, and $G^5$ discharging through pipe $G^2$ into the series of boilers $O^2$, $O^1$ and $F^1$. Under general conditions this course guarantees the best utilization of the heat. When the liquid from boiler $F^2$ has reached the proper concentration or whenever it may be otherwise desirable, the liquid is transferred from boiler $F^2$ to boiler $F^1$ through pipe $G^2$ by means of a pump (not shown) or any other suitable means.

In all the boilers, but especially in boilers $F^2$ and $F^1$ the liquid should enter at the bottom and leave at the top. From boiler $F^1$ the liquid may be delivered if desired, by a suitable pump (not shown), through pipe $G^4$ into main liquor pipe $G^5$ from which subconnection pipes $G^6$ lead to any of the vessels C so that the preheated and concentrated liquids may be distributed into the vessels C. Pipe $G^5$ is in direct connection with the weak-liquor storage tank W, so that either cold or preheated, dilute or concentrated liquids may be supplied to vessels C as the situation may require. Though the conduction of liquids in the course prescribed above is generally preferred, it is to be understood that in the conduction of the liquid many variations may take place and that it may also be arranged that liquids of different kinds may be treated simultaneously in the various parts of the apparatus.

The passage of the gases through the tubular boilers $F^1$, $F^2$ may be effected in the usual way, the gases entering the boilers in the upper part of the flues and leaving at the bottom, but as the producer gases have already transferred a considerable part of their heat to the liquid in the vessel C the course of the gases in the boilers must be regulated with all the precautions necessary to get as much as possible of the available heat. I, therefore, prefer to provide boilers $F^1$ and $F^2$ with partitions $H^1$ and $H^2$ respectively, terminating somewhat below the upper wall of the flue, thus dividing the flue space into two equal compartments and to cause the hot gases to enter the boiler F¹ near the bottom through pipe K¹, pass over partition H¹, leave boiler F¹ through pipe K² and pass in the same zig-zag way through boiler F² and thence through the other main steam boilers which may be arranged in the series, until the gases are so cooled down that the heat they are then carrying represents an item not deserving further consideration.

Primary evaporation vessels C may be constructed to run as vacuum boilers, though it has been found advantageous to provide the vessels C with suitable hoods to lead off the water vapor and to construct the hoods so that the exit thereto may be closed by a suitable damper as shown in Fig. 1, and so that air may enter the vessels C through a series of inlets L in such manner as to strike the surface of the liquid and to thus increase the vaporization in a very favorable manner. The air highly saturated with water vapor leaves through the exit M into a pipe N and may then be blown by suitable means (not shown) into the combustion zone of the gas producer to supply the air for the combustion and the water for the generation of hydrogen and carbon monoxid.

By distributing the hot gases over a plurality of vessels C I am able to bring as much heating surface, which might more properly be called cooling surface, into action as I deem necessary with the purpose in view, as I am thus able to admit to each of the vessels C just as much heat in the form of hot gases as may be necessary in order to attain the temperature at which I wish to keep the liquid and as hereinabove pointed out, by admitting the hot gas to the tubes B at the lowest part of the vessels C, I create a steady circulation of the liquid so that a uniform temperature is caused to prevail in the vessels C. It is readily seen that by this method no conditions for steam generating arise around the tubes B and, although it seems contrary to the purpose of evaporating liquids, this is one of the points upon which the success of the work depends. If hot gases are admitted to the tubes B in such quantities that steam generation sets in, the chemicals dissolved in the liquid would take part in the process by covering the tubes with an ever increasing coat of solid material, an effect which is explained by the Leidenfrost phenomenon, and thus vaporization will become impossible in a very short time and great inconvenience be caused by the delay and labor entailed by the injudicious exposure of the liquids to the hot producer gases, explosion gases, coke-oven gases or other gases which might be utilized. As in my process I cause a steady circulation and avoid the generation of steam around the tubes B, the Leidenfrost phenomenon cannot occur and all the inconveniences resulting from its influence are entirely avoided. It is clear that as a steady circulation is going on in the vessel C, the liquid on top is very nearly as hot as that at the bottom. By my method the vaporization is going on only at the surface of the liquid.

Crystals may segregate from the liquid when the latter becomes saturated in the course of the process, but these crystals are not so bad in their effect because they are loose and settle as sediment at the bottom of the vessels, whence they may be removed through outlets C¹. Valves C² permit liquids to be drawn from vessels C. Should the crystals occur in too great masses the liquid may be stirred in any of the well known ways.

By dividing the flues of boilers F¹ and F² into two compartments by a partition, the gases are caused to travel in a path which is twice as long as the path they would travel if admitted to the flues of each boiler at the highest point and drawn off at the bottom to enter the flues of the next boiler again at the highest point. By this arrangement the number of the required boilers is greatly reduced, for by this system the sensible heat of the gases is transferred to the liquid in the most effective way, as on account of the buoyancy, the hot gases tend to remain at the higher points around the top of the partition and move down gradually as they are cooled.

One of the advantages of my method consists in the uniform vaporization in vessels C exclusively from the surface of the liquid. Though the liquid is not kept at the boiling point and though the effect may not be quite as great as it might be if the liquid were kept boiling permanently, all the troubles from incrustations on the heating tubes are avoided, a great deal of inconvenience and labor is saved, and thus the effect, in the long run, is quite as satisfactory.

Another benefit derived from the process carried on in vessels C, according to my method, consists in the fact that the vessels C serve to control or curb down the unfavorable temperature of the hot gases in much the same way that a rheostat controls an electric current, the gases being controllable to such a degree that the amount of heat they carry in passing through vessels C is such as to allow the concentration of the liquids in boilers F¹, F² to be managed in about the same way as is done with steam, with or without the employment of vacuum. The final concentration of liquids, may take place in vessels C, in boilers F¹ or in any other convenient manner.

It is of course understood that various changes in the form, proportions and arrangement of parts may be resorted to without departing from the principle or sacrificing any of the advantages of the invention as described in the specification and defined in the appended claims.

Having described my invention, what I claim as new and desire to secure by Letters Patent is:

1. A method of heating and evaporating liquids which consists in passing hot gas through a system of primary evaporation vessels, distributing the gas over as many such evaporation vessels as is necessary to prevent the contained liquids from reaching the boiling point, substantially reducing the temperature of said gas and subsequently passing the same through a series of boilers, generating steam in said boilers and using said steam for evaporation purposes in any suitable way.

2. A method of heating and evaporating liquids which consists in passing hot gas through a system of primary evaporation vessels, regulating the quantity of gas admitted to said vessels, distributing the gas over as many such evaporation vessels as is necessary to prevent the contained liquids from reaching the boiling point, substantially reducing the temperature of said gas and subsequently passing the same through a series of boilers, generating steam in said boilers and using said steam for evaporation purposes in any suitable way.

3. A method of heating and evaporating liquids which consists in passing hot gas through a system of primary evaporation vessels, regulating the quantity of the gas admitted to said vessels, admitting the gas at the bottom of said evaporation vessels, distributing the gas over as many of the same as is necessary to prevent the contained liquids from reaching the boiling point, substantially reducing the temperature of said gas and subsequently passing the same through a series of boilers, generating steam in said boilers and using said steam for evaporation purposes in any suitable way.

4. A method of heating and evaporating liquids which consists in passing hot gas through a series of primary evaporation vessels, regulating the quantity of the gas admitted to said vessels, circulating the gas in a zig-zag path through said vessels, distributing the gas over as many such evaporation vessels as is necessary to prevent the contained liquids from reaching the boiling point, substantially reducing the temperature of said gas and subsequently passing the same through a series of boilers, generating steam in said boilers and using said steam for evaporation purposes in any suitable way.

5. A method of heating and evaporating liquids which consists in passing hot gas through a series of primary evaporation vessels, causing a circulation of the liquid from the bottom to the top of the vessels, regulating the quantity of the gas admitted to said vessels, distributing the gas over as many such evaporation vessels as is necessary to prevent the contained liquids from reaching the boiling point, substantially reducing the temperature of said gas and subsequently passing the same through a series of boilers, generating steam in said boilers and using said steam for evaporation purposes in any suitable way.

6. A method of heating and evaporating liquids which consists in passing hot gas through a series of primary evaporation vessels, maintaining each of said vessels respectively at a substantially uniform temperature, regulating the quantity of the gas admitted to said vessels, distributing the gas over as many such evaporation vessels as is necessary to prevent the contained liquids from reaching the boiling point, substantially reducing the temperature of said gas and subsequently passing the same through a series of boilers, generating steam in said boilers and using said steam for evaporation purposes in any suitable way.

7. A method of heating and evaporating liquids which consists in passing hot gas through a series of primary evaporation vessels, passing air over the surface of the liquid in said vessels to increase evaporation, distributing the gas over as many evaporation vessels as necessary to prevent the contained liquids from reaching the boiling point, substantially reducing the temperature of said gas and subsequently passing the same through a series of tubular boilers, generating steam in said boilers and using said steam for evaporation purposes in any suitable way.

8. A method of heating and evaporating liquids which consists in passing hot gas through a system of primary evaporation vessels, closing said primary evaporation vessels by any suitable means and attenuating the atmospheric pressure over the liquid contained in the same, distributing the gas over as many evaporation vessels as necessary to prevent the contained liquids from reaching the boiling point, substantially reducing the temperature of said gas, subsequently passing the same through a system of tubular boilers in a zig-zag path, generating steam in said boilers and using said steam for evaporating purposes in any suitable way.

9. A method of heating and evaporating liquids which consists in passing hot gas through primary evaporation vessels, distributing the gas over as many evaporation vessels as necessary to prevent the contained liquids from reaching the boiling point, substantially reducing the temperature of said gas and subsequently passing the same through a series of tubular boilers, attenuating the atmospheric pressure in the evaporation chambers of said tubular boilers, generating steam in said boilers and using said steam for evaporation purposes in any suitable way.

10. A method of heating and evaporating liquids which consists in passing hot gas through a system of primary evaporation vessels, distributing the gas over as many such evaporation vessels as is necessary to prevent the contained liquids from reaching the boiling point, substantially reducing the temperature of said gas, subsequently passing the same through a system of tubular boilers in a zig-zag path, generating steam in said boilers and using said steam for evaporation purposes in any suitable way.

11. A method of heating and evaporating liquids which consists in passing hot gas through a system of primary evaporation vessels, distributing the gas over as many such evaporation vessels as is necessary to prevent the contained liquids from reaching the boiling point, substantially reducing the temperature of said gas, subsequently passing the same through a system of tubular boilers in a zig-zag path, generating steam in said boilers, using said steam for evaporation purposes in any suitable way and conducting the liquid in a course opposite to that of the gas.

12. A method of heating and evaporating liquids which consists in passing hot gas through a system of primary evaporation vessels, distributing the gas over as many such evaporation vessels as is necessary to prevent the contained liquids from reaching the boiling point, substantially reducing the temperature of said gas, subsequently passing the same through a system of main boilers, evaporating liquid and generating steam in said boilers and passing said steam through a series of auxiliary boilers containing liquid to be evaporated.

13. A method of heating and evaporating liquids which consists in passing hot gas through a system of primary evaporation vessels, distributing the gas over as many such evaporation vessels as is necessary to prevent the contained liquids from reaching the boiling point, substantially reducing the temperature of said gas, subsequently passing the same through a system of main boilers, evaporating liquid and generating steam in said boilers, passing said steam through a series of auxiliary boilers and attenuating the atmospheric pressure over the liquid in said auxiliary boilers.

14. A method of heating and evaporating liquids which consists in passing hot gas through a system of primary evaporation vessels, distributing the gas over as many such evaporation vessels as is necessary to prevent the contained liquids from reaching the boiling point, subsequently passing said gas through a system of main boilers, generating steam in said boilers, passing said steam through a series of auxiliary boilers and preheating the liquids to be evaporated by passing the same successively through the auxiliary boilers and main boilers to the primary evaporation vessels in a course opposite to the course of the hot gases and steam in the main boilers and the course of the steam in said auxiliary boilers respectively.

In testimony whereof I have signed this specification in the presence of two subscribing witnesses.

OTTO K. ZWINGENBERGER.

Witnesses:
PAULA BEY,
FLORENCE M. LONSETH.